Oct. 24, 1967      R. E. CULLITY      3,348,540
PRESSURE REGULATOR, MOUTHPIECE, EXHAUST DUCT AND STRAP
FOR UNDERWATER BREATHING APPARATUS
Filed Aug. 5, 1964      3 Sheets-Sheet 1

RICHARD E. CULLITY
INVENTOR.

BY

ATTORNEY.

Oct. 24, 1967  R. E. CULLITY  3,348,540
PRESSURE REGULATOR, MOUTHPIECE, EXHAUST DUCT AND STRAP
FOR UNDERWATER BREATHING APPARATUS
Filed Aug. 5, 1964  3 Sheets-Sheet 2

RICHARD E. CULLITY
INVENTOR.

BY
*Nicholas T. Vohr*
ATTORNEY.

Oct. 24, 1967 R. E. CULLITY 3,348,540
PRESSURE REGULATOR, MOUTHPIECE, EXHAUST DUCT AND STRAP
FOR UNDERWATER BREATHING APPARATUS
Filed Aug. 5, 1964 3 Sheets-Sheet 3
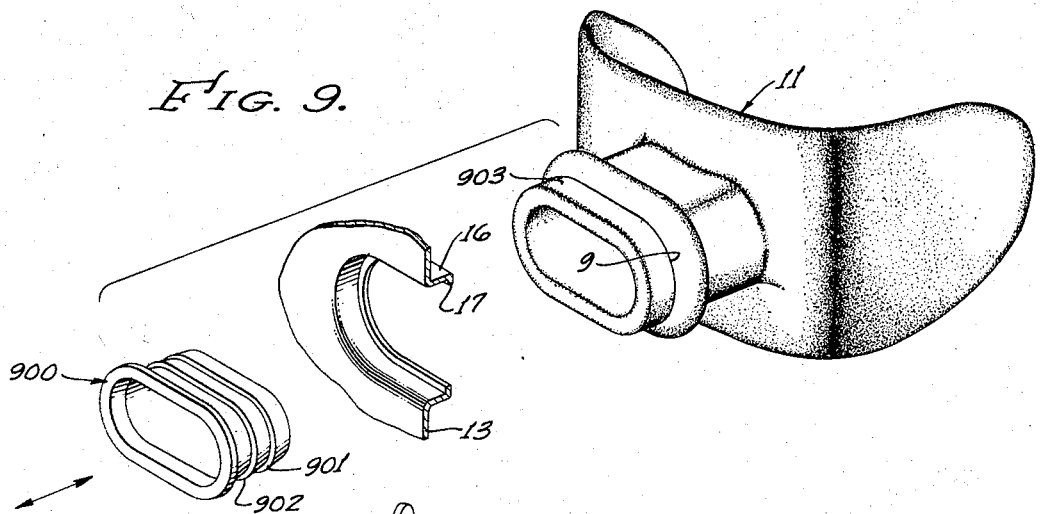
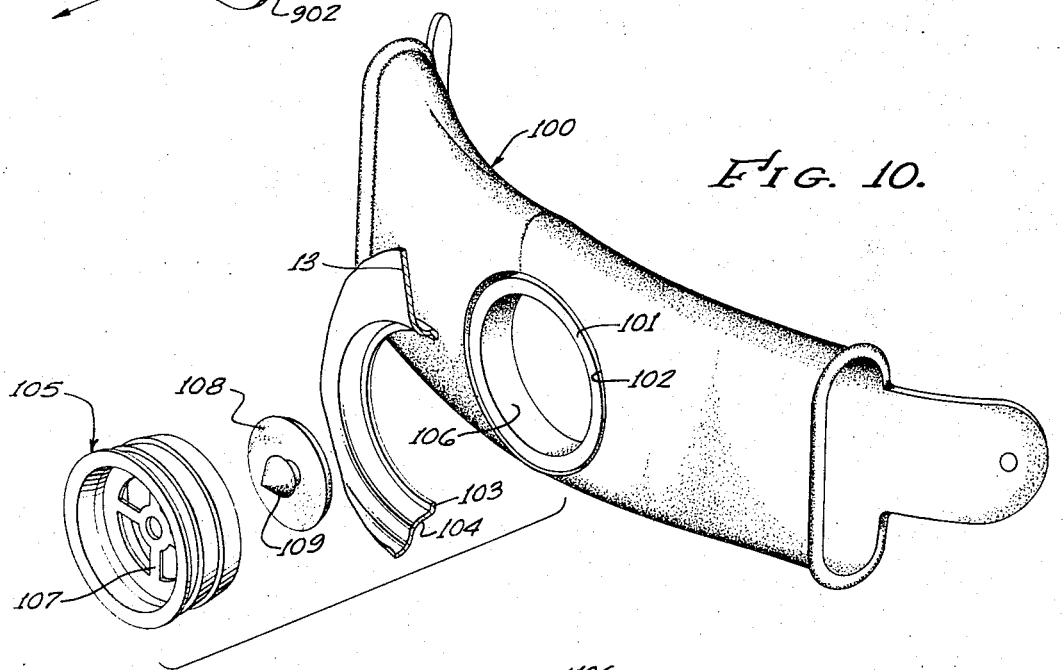
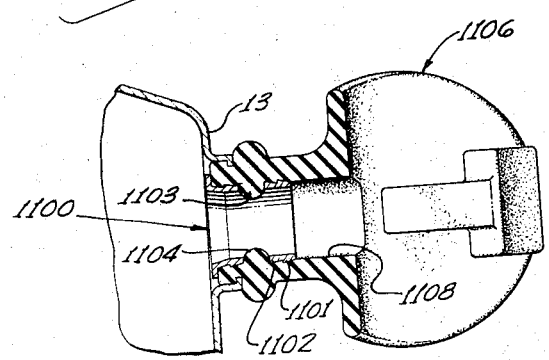
RICHARD E. CULLITY
INVENTOR.
BY
ATTORNEY.

United States Patent Office 3,348,540
Patented Oct. 24, 1967

3,348,540
PRESSURE REGULATOR, MOUTHPIECE, EXHAUST DUCT AND STRAP FOR UNDERWATER BREATHING APPARATUS
Richard E. Cullity, La Mirada, Calif., assignor to W. J. Voit Rubber Corp., a corporation of California
Filed Aug. 5, 1964, Ser. No. 387,737
3 Claims. (Cl. 128—147)

This invention relates to pressure regulators for self-contained underwater breathing apparatus, known as SCUBA, and more particularly to a second stage pressure regulator having an elastomeric mouthpiece and an elastomeric exhaust duct, mounted on and clamped to the back wall of the regulator housing.

It is an object of this invention to provide novel means of attaching the mouthpiece and the exhaust duct to the back wall of the second stage regulator, the mouthpiece and the exhaust duct being provided with internal and external elastomeric flanges and retainers fitting into the flanges for locking them to the back wall of the regulator.

It is also an object of this invention to provide the novel connection of the above type in which the retainer used for fastening the exhaust duct is provided with a flap valve.

Other objects and advantages will appear from the following description of the embodiment of the invention, and the novel features will be particularly pointed out in the appended claims.

Referring to the drawings.

FIG. 9 is a perspective view of the mouthpiece, of a portion of the backwall of the regulator and of the mouthpiece retainer of the type illustrated in FIG. 8.

FIG. 10 is a perspective view of the exhaust duct, portion of the rear wall of the regulator, and of the retainer with a flap valve.

FIG. 11 is a cross-sectional view of the mouthpiece and a portion of the rear wall of the regulator with a modified version of a retainer.

Figure 3:
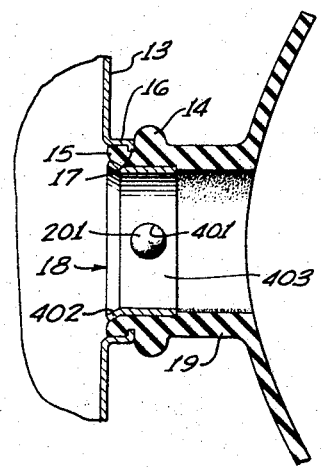
FIG. 3 is a cross-sectional view of the mouthpiece and and of a portion of the rear wall of the regulator with the section taken along line 3—3 illustrated in FIG. 2.
Figure 1:
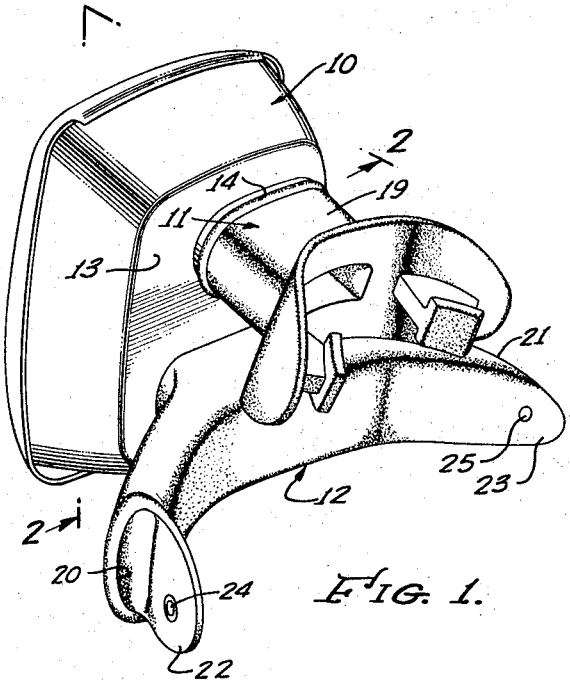
FIG. 1 is a perspective view of a pressure regulator and of the mouthpiece and exhaust duct mounted on the rear wall of the regulator casing.
Figure 2:
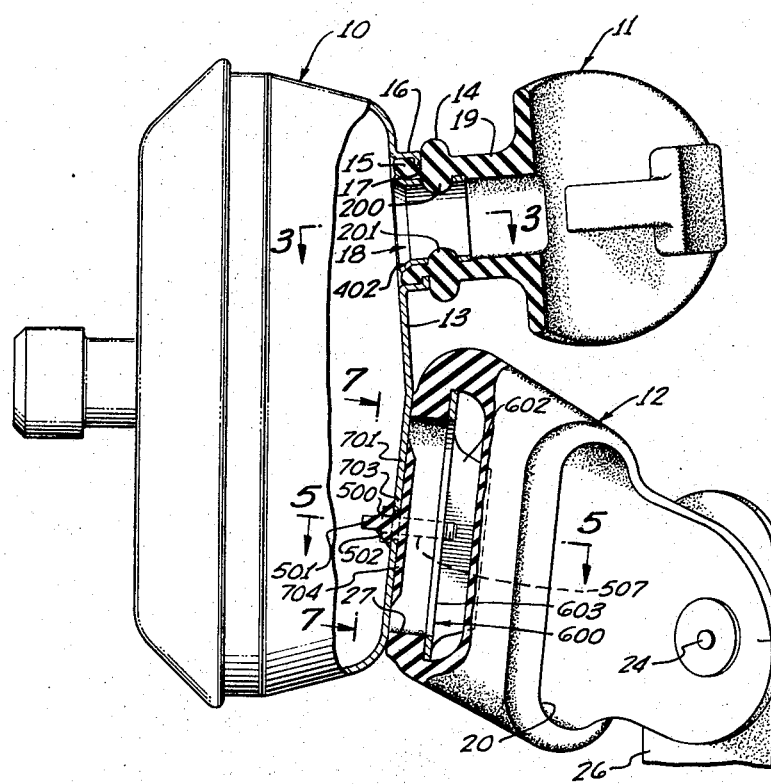
FIG. 2 is a side view partly sectioned of the regulator illustrated in FIG. 1, with the view taken along line 2—2 illustrated in FIG. 1.
Figure 4:
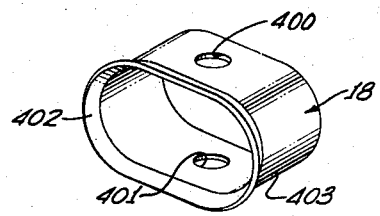
FIG. 4 is a perspective view of the insert used for locking the mouthpiece to the rear wall of the regulator.
Figure 5:
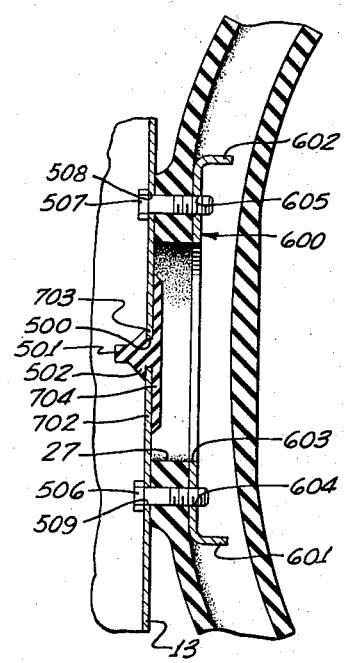
FIG. 5 is a cross-sectional view of the exhaust duct and of that portion of the back wall of the regulator which is used for fastening the exhaust duct to the regulator, this section being taken along line 5—5 illustrated in FIG. 2.

Referring to FIGS. 1 through 5, FIG. 1 illustrates the perespective view of the regulator casing 10, with a mouthpiece 11, and an exhaust duct 12, fastened to the rear wall 13 of the regulator casing. The connection between the mouthpiece and the rear wall of regulator is illustrated in sectional view in FIGS. 2 and 3. The mouthpiece is provided with external and internal flanges 14 and 15. The rear wall 13 of the regulator is provided with a flange 16 which also includes an inwardly bent-in portion, or flange, 17 which fits into the corresponding peripheral groove provided in the neck 19 of the mouthpiece 11 between the external and the internal flanges 14 and 15 of the mouthpiece. The mouthpiece retainer 18 fits tightly into the opening in the mouthpiece in the manner illustrated in FIGS. 2 and 3. The perspective view of the mouthpiece retainer is illustrated in FIG. 4. It is provided with two orifices 400 and 401, a flange 402, and an ovally cylindrical portion 403. The mouthpiece is provided with two internal hemispherical projections 200 and 201 which fit into the orifices 400 and 401 of the mouthpiece retainer when the mouthpiece retainer is inserted into the neck 19 of the mouthpiece. The mouthpiece retainer is dimensioned so that it expands the flanges 14 and 15 against flanges 16 and 17 on the rear wall 13 of the regulator and in this manner positively locks and makes an air-tight and water-tight connection between the mouthpiece and the rear wall of the regulator. The exhaust duct 12 is provided with two open ends 20 and 21 and extensions 22 and 23. Extensions 22 and 23 are provided with snaps 24 and 25 which are used for fastening a neck strap 26 to the exhaust duct. The neck strap 26 is used for suspending the regulator from the neck of the user when the regulator is not in use. The central portion of the exhaust duct is provided with an opening 27 which is aligned with a corresponding opening 700 in the rear wall 13 of the regulator. The opening 700 is provided with two cross braces 701 and 702 and a circular base 703 which is used for mounting a flap valve 704 on the rear wall of the regulator. The circular base 703 for this purpose is provided with a central opening 500 which is used for inserting a stem 501 of the flap valve through the opening. The stem is povided with a cone shaped member 502 which is used for locking the flap valve in place on the rear wall 13 of the regulator in the manner illustrated in FIG. 5.

Figure 6:
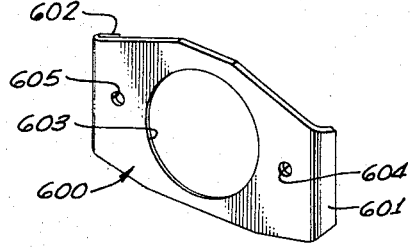
FIG. 6 is a perspective view of the exhaust duct plate used for fastening the exhaust duct to the rear wall of the regulator.

The exhaust duct is fastened to the rear wall 13 of the regulator in a manner illustrated in FIGS. 2, 5, 6, and 7. A perspective view of the exhaust duct plate 600, which is used for fastening the exhaust duct valve to the rear wall 13 of the regulator is illustrated in FIG. 6. It includes two bent over baffle plates 601 and 602, a central opening 603 and two threaded openings 604 and 605. The threaded openings are used for fastening the plate to the regulator by means of two studs 506 and 507. The exhaust duct is also provided with two openings 508 and 509 for interconnecting wall 13 with plate 600. Plate 600, therefore, clamps duct 12 to 13 by means of two studs 506 and 507 in the manner illustrated in FIGS. 5 and 7. The baffle plates 601 and 602 are used for protecting the exhaust duct, and especially the flap valve 704 portion of the duct from water cross-currents which may open the flap valve and thus flood the regulator chamber. Therefore, plate 600 acts as a means for fastening the exhaust duct and also as a means for obtaining proper operation of the exhaust valve 704.

Figure 8:
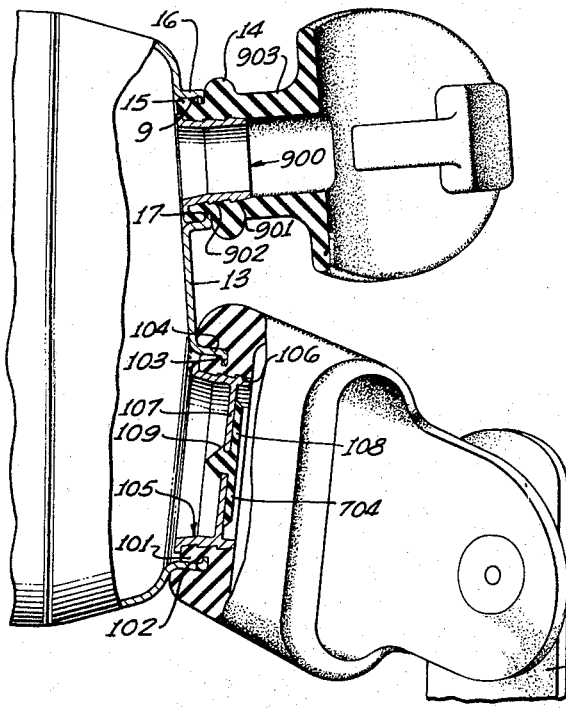
FIG. 8 is a side view, partly sectioned, of the regulator casing, of the mouthpiece, and of the exhaust duct, illustrating a modified version of fastening the mouthpiece and the exhaust duct to the rear wall of the regulator.
Figure 7:
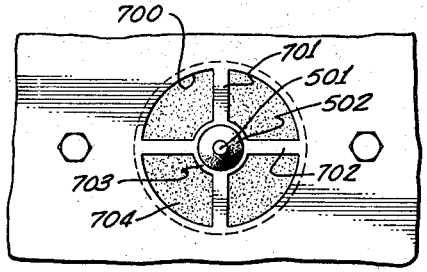
FIG. 7 is a plan view of that portion of the inner portion of the rear wall of regulator which is used for mounting a flap valve, the plan view being taken in direction of arrows 7—7 illustrated in FIG. 2.

FIGURE 8 illustrates a sectional view of the mouthpiece and of the exhaust duct using different connections between the regulator case, the mouthpiece and exhaust duct. In FIG. 8, the mouthpiece now uses a slightly different retainer 900 illustrated in perspective view in FIG. 9. The retainer is provided with at least two wedge-shaped projections 901 and 902 on its outer surface which wedge the retainer tightly in the neck 903 of the mouthpiece. The construction of the wall portion 13 of the regulator is identical to that illustrated in FIGS. 1 through 5. It includes an outwardly projecting flange 16 and an inwardly bent flange 17. The bent-in portion 17 of the flange fits into a corresponding groove 9 provided between the flanges 14 and 15 of the mouthpiece.

The perspective view of the connections between the exhaust duct 100 and rear wall 13 of the regulator is illustrated in FIG. 10. The exhaust duct now is provided with a ring-shaped flange 101 and a circular groove 102 surrounding flange 101. Groove 102 acts as a seat for an inwardly bent flange 103 on rear wall 13 of the regulator. The rear wall of the regulator is also provided with flange 104 which fits snugly over elastomeric flange 101 of the exhaust duct. A ring-shaped retainer 105 fits snugly into the circular opening 106 in the exhaust duct in the manner illustrated in FIG. 8 and in this manner locks the exhaust duct in a positive manner to the rear wall 13 of the regulator. The exhaust duct retainer is provided with a spider seat 107 for a flap valve 108. A cone-shaped valve stem 109 is provided on one side of the flap valve for attaching the flap valve to spider 107 in the manner illustrated in FIG. 8. According to FIGS. 8 and 10, retainer 105 now performs a dual function: it acts as a retainer and it also includes a spider and a flap valve which is now mounted within the retainer, while in FIGS. 1–5 the flap valve is mounted on the rear wall of the regulator casing.

FIG. 11 illustrates that additional version of the mouthpiece retainer 1100 which is provided with a plurality of wedge-shaped ribs 1101, 1102, and also appropriate openings for accommodating projecting buttons 1103 and 1104 provided on the inner wall 1108 of mouthpiece 1106. The retainer in FIG. 11 combines the features of the retainers 18 and 900 in FIGS. 1, 4 and 9.

What is claimed as new is:

1. A pressure regulator for underwater breathing apparatus, said regulator including a regulator casing having a rear wall, first and second aligned openings in said rear wall, first and second rear wall flanges outwardly projecting and surrounding said first and second openings, respectively, a mouthpiece having a neck terminating in a mouthpiece flange fitting into and being surrounded by said first flange, a first retainer fitting into said mouthpiece neck and flange for fastening said mouthpiece to said rear wall, an exhaust duct having an exhaust duct flange fitting into the second rear wall flange, and a second retainer fitting into said exhaust duct flange for fastening said exhaust duct to said rear wall, said second retainer including a spider and a one-way flap valve, mounted on top of and adjacent to the outer surface of said spider, said flap valve closing off said spider against ambient water surrounding the outer side of said valve when said regulator is in use.

2. A pressure regulator for self-contained underwater breathing apparatus comprising a regulator casing having a rear wall, a first opening in said rear wall having a first outwardly projecting circumferential flange, an elastomeric mouthpiece having a neck and an inner-locking flange at the outer end of said neck, said locking flange fitting into said first flange, an outer flange on said neck abutting against said first flange and a retainer fitting into said locking flange, and said neck, said retainer positively locking said mouthpiece to said rear wall by wedging said locking flange against said first rear wall flange, said retainer comprising a hollow tube having a central opening for permitting flow of air through said retainer and said mouthpiece and said regulator further including a second opening in said rear wall, said second opening having at least one cross-arm spanning and bisecting said second opening, said second opening being in line with, below and in spaced relationship with respect to said first opening on said rear wall, an exhaust duct having at least one open duct and a centrally located exhaust opening in said exhaust duct, an exhaust duct flange, surrounding said exhaust duct opening, said exhaust opening being in line with said second opening in said rear wall, a one-way flap valve mounted on the outer side of said rear wall and over said cross-arm and normally closing off said second opening, means for clamping said exhaust duct to said rear wall with the aid of said exhaust flange and a regulator mounting means detachably fastened to two outer ends of said exhaust duct.

3. The pressure regulator as defined in claim 2 wherein said means for clamping the exhaust duct to the rear wall comprises an exhaust duct plate having a centrally located opening in line with said second opening, and fastening means for fastening said plate to the rear wall of said casing through said exhaust duct, said plate and said fastening means holding said exhaust duct in a fixed position on said rear wall.

References Cited

UNITED STATES PATENTS

| | | | |
|---|---|---|---|
| 2,314,315 | 3/1943 | Scheele | 285—239 |
| 2,363,362 | 11/1944 | Tideout | 289—85 |
| 3,101,732 | 8/1963 | Salla Valle | 128—142 |

RICHARD A. GAUDET, *Primary Examiner.*

K. K. HOWELL, *Assistant Examiner.*